March 24, 1953   J. L. HEISTAND   2,632,616
HOLDING DEVICE FOR FISHING RODS AND THE LIKE
Filed Dec. 29, 1949
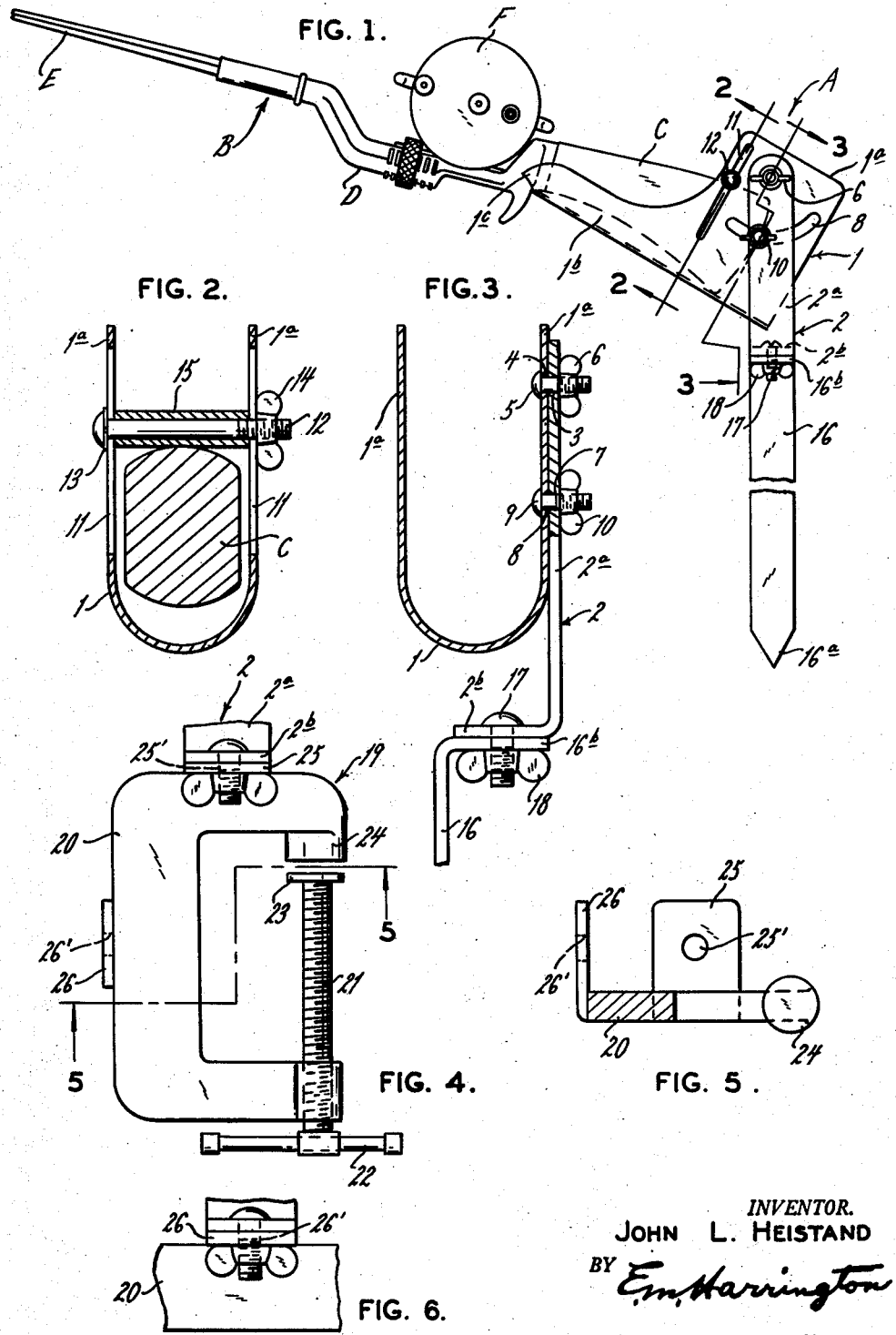
INVENTOR.
JOHN L. HEISTAND
BY E. M. Harrington
ATTORNEY Patented Mar. 24, 1953

2,632,616

UNITED STATES PATENT OFFICE 2,632,616

HOLDING DEVICE FOR FISHING RODS AND THE LIKE

John L. Heistand, Overland, Mo.

Application December 29, 1949, Serial No. 135,665

2 Claims. (Cl. 248—42)

This invention relates generally to holding devices for fishing rods, particularly fishing rods provided with reels, and more specifically to holding devices of this type adapted to support fishing rods on banks adjacent to streams or on boats supported on bodies of water, the predominant object of the invention being to provide a holding device of the type referred to above which is of extremely simple construction and which, because of its improved arrangement, is capable of performing its intended function in an improved and highly efficient manner.

Fig. 1 is a side elevation of the improved holding device of this invention, a portion of a fishing rod having a reel associated therewith being associated with the holding device of Fig. 1, a portion of the holding device being broken away.

Fig. 2 is an enlarged cross-section taken on line 2—2 of Fig. 1.

Fig. 3 is an enlarged cross-section taken on line 3—3 of Fig. 1, a portion of the holding device being broken away.

Fig. 4 is a fragmentary side elevation of a clamp which forms a part of the holding device when same is supported by a boat.

Fig. 5 is a horizontal section taken on line 5—5 of Fig. 4.

Fig. 6 is a detail view of the connection between the bracket and clamp of Fig. 4.

In the drawing, wherein are shown for purposes of illustration, merely, two embodiments of the invention, A designates generally the improved holding device of this invention. The holding device A comprises a cradle 1 which is substantially U-shaped in cross-section, as is shown to good advantage in Figs. 2 and 3, said cradle being formed from sheet metal or other suitable material. When viewed in side elevation the opposed side walls of the cradle are shaped as is shown to good advantage in Fig. 1; that is to say, said opposed side walls of the cradle are of the maximum height at the rear portion 1a of said cradle and with forward portions 1b of the side walls of the cradle of substantially reduced height relative to said real portion of the cradle. Also, the extreme forward portions 1c of the opposed side walls of the cradle 1 are of curved and pointed configuration as shown in Fig. 1.

Associated with the cradle 1 of the holding device A, as illustrated in Figs. 1, 2, and 3, is a bracket element 2 which includes a vertical portion 2a and a horizontal portion 2b, said vertical portion of the bracket element 2, and a wall of the cradle 1 being provided with alined openings 3 and 4, respectively, through which a bolt 5 is extended, the bolt 5 having mounted thereon a wing nut 6. Also, the vertical portion 2a of the bracket element 2 is provided with a second opening 7, and the wall of the cradle 1 in which the opening 4 is formed has formed therein an arcuate slot 8 with a portion of which the opening 7 is alined, and a bolt 9, which has a wing nut 10 mounted thereon, is extended through said opening 7 and said arcuate slot 8. The cradle 1 is swingable about the bolt 5 to different positions of angularity relative to the bracket element 2, the wing nuts 6 and 10 being unscrewed slightly when the cradle is to be adjusted from one to a different position after which said wing nuts are reset in clamping engagement with respect to the vertical portion of the bracket element 2 so as to firmly retain the cradle in the position to which it has been adjusted.

Formed in each of the opposed side walls of the cradle 1 is a slot 11, the slots 11 of said opposed side walls of the cradle being alined with each other transversely of the cradle, and said slots being substantially parallel relative to the rear edges of the opposed side walls of said cradle. Supported in the slots 11 of the opposed side walls of the cradle 1 is an elongated, headed bolt 12, said bolt being extended transversely of said cradle with a washer 13, that is disposed beneath the head of the bolt, contacting with the outer face of one side wall of the cradle, and with a wing nut 14, which is mounted on the opposite screwthreaded end portion of the bolt 12, contacting with the outer face of the other side wall of the cradle. The elongated bolt 12 is embraced by a tubular spacer 15 whose opposite ends contact with the inner faces of the opposed side walls of the cradle 1 (Fig. 2). The bolt and spacer assembly provided by the elongated bolt 12 and the tubular spacer 15 may be adjusted longitudinally of the slots 11 for a purpose to be hereinafter explained, the wing nut 14 being unscrewed slightly to permit of such adjustment and said wing nut being reset with respect to the adjacent side wall of the cradle so as to clamp the bolt and spacer assembly in the position to which it has been adjusted.

The bracket element 2 has attached thereto a stake 16 which is provided with a vertical portion having a pointed lower end portion 16a that facilitates forcing said stake into the ground, and said stake is provided, also, with a horizontal portion 16b at the upper end thereof. The horizontal portions 2b and 16b of the bracket element 2 and the stake 16, respectively, are arranged in overlapping and underlapping relation, as is shown in Fig. 3, and a bolt 17 is extended through alined openings formed through said horizontal portions 2b and 16b, said bolt 17 having a wing nut 18 mounted thereon which is adjustable into clamping engagement with the lower face of the horizontal portion 16b of the stake 16 so as to secure said horizontal portions together. The particular fishing rod B shown in the drawing comprises a handle portion C, a recessed portion D located immediately forward of the handle portion C, and a rod portion E projected forwardly of said recessed portion D, said recessed portion having a reel F suitably mounted thereon.

In the use of the improved holding device of the present invention, which is illustrated in Figs. 1, 2, and 3 of the drawing, the stake 16 is forced into the ground so as to support the holding device for use, and the cradle 1 of the holding device is adjusted to a desired position, this being accomplished by unscrewing the wing nuts 6 and 10 slightly, adjusting the cradle to the desired position, and thereafter resetting said wing nuts in their clamping positions so as to retain the cradle in its position of adjustment. The wing nut 14 is then unscrewed slightly and the bolt 12 and spacer 15 are moved upwardly to permit the handle C of a fishing rod to be disposed in the cradle, the bolt and spacer assembly then being lowered until the spacer 15 contacts with the upper portion of the fishing rod handle when the wing nut 14 is reset to clamp the bolt and spacer assembly in place where it secures the handle of the fishing rod to the cradle. If it should be desired to adjust the outer portion of the fishing rod vertically in the use of the holding device, this may be quickly and conveniently done by unscrewing the wing nuts 6 and 10, adjusting the cradle 1 to the desired position, and thereafter resetting said wing nuts 6 and 10. Also, the outer portion of the fishing rod may be adjusted horizontally by merely unscrewing the wing nut 18 and rotating the bracket element 2 about the bolt 17 to position the outer portion of the fishing rod in the desired position, said wing nut 18 thereafter being reset to retain the bracket element 2 in its position of adjustment.

Attention is directed to the fact that when a fish strikes the hook of the fishing line of a fishing rod supported by the improved holding device of this invention, said fishing rod may be quickly released from the holding device by pulling the fishing rod forwardly so as to disengage the handle of the fishing rod from its normal position beneath the spacer 15, there being sufficient looseness between the spacer and the handle of the fishing rod to permit this. On the other hand, however, if a fisherman desires to leave the fishing rod unattended he may adjust the spacer into tight engagement with the handle of the fishing rod so that the fishing rod may not be pulled loose from the holding device by a hooked fish or for other reasons.

When the improved holding device of this invention is to be employed in a boat, the stake 16 is detached from the bracket element 2 by removing the bolt 17 and its associated wing nut 18 and by substituting for said stake a clamp 19, such as that shown in Figs. 4, 5, and 6. The clamp 19 comprises a substantially U-shaped frame member 20, one leg of which screwthreadedly supports a screwthreaded element 21 having an operating handle 22 at one end and a clamping element 23 at its opposite end which is adjustable toward and from a clamping portion 24 that comprises a part of the clamp frame 20. The clamp frame 20 has fixed thereto at the top thereof, as said clamp is illustrated in Fig. 4, a plate 25, said plate being provided with an aperture 25'. The clamp 19 is attached to the bracket element 2 by passing the bolt 17 through alined apertures of the horizontal portion 2b of said bracket element and the plate 25 of the clamp and applying the wing nut 18 to said bolt 17 so as to clamp said parts 2b and 25 together. The clamp 19 is then applied to the boat, a portion of the boat being clamped between the clamp portions 23 and 24 in an obvious manner. The clamp 19 is provided with a second plate 26 that has an aperture 26' formed therethrough, this plate being adapted to have the portion 2b of the bracket element 2 secured thereto by means of a bolt and wing nut assembly when the clamp is secured to a part of a boat with the open side of the clamp frame facing downwardly.

I claim:

1. A holding device for fishing rods and the like comprising a cradle adapted to receive a portion of an article held by the holding device, a bracket element, means for attaching said cradle to said bracket device for pivotal movement with respect thereto, locking means for locking said cradle in position to which it is adjusted, said locking means comprising an arcuate slot formed in a wall portion of said cradle and a bolt extended through an aperture formed through said bracket element and through said arcuate slot, means movably supported by said cradle for clamping said portion of the article held by the holding device relative to said cradle, and means for supporting said bracket element in position for use of the holding device.

2. A holding device for fishing rods and the like comprising a cradle adapted to receive a portion of an article held by the holding device, a bracket element, means for attaching said cradle to said bracket device for pivotal movement with respect thereto, means movably supported by said cradle for clamping said portion of the article held by the holding device relative to said cradle, said cradle having opposed walls that are provided with alined slots, and said movable clamping means comprising an element which is supported for movement with respect to said slots and has a nut mounted on an end thereof for clamping said element in various positions to which it is adjusted, and means for supporting said bracket element in position for use of the holding device.

JOHN L. HEISTAND.

REFERENCES CITED

The following references are of record in the file of this patent:

UNITED STATES PATENTS

| Number | Name | Date |
|---|---|---|
| 1,525,044 | Primrose | Feb. 3, 1925 |
| 2,238,127 | Nissen | Apr. 15, 1941 |
| 2,301,885 | Laehr | Nov. 10, 1942 |
| 2,454,458 | Kaetker | Nov. 23, 1948 |
| 2,458,881 | Steuer | Jan. 11, 1949 |
| 2,502,272 | Patton | Mar. 28, 1950 |